(12) United States Patent
Koide et al.

(10) Patent No.: US 9,399,567 B2
(45) Date of Patent: Jul. 26, 2016

(54) TRAVELING CONTROL DEVICE FOR INDUSTRIAL VEHICLE

(71) Applicant: KABUSHIKI KAISHA TOYOTA JIDOSHOKKI, Kariya-shi, Aichi-ken (JP)

(72) Inventors: Yukikazu Koide, Kariya (JP); Norihiko Kato, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 0 days.

(21) Appl. No.: 14/642,848

(22) Filed: Mar. 10, 2015

(65) Prior Publication Data
US 2015/0259184 A1    Sep. 17, 2015

(30) Foreign Application Priority Data

Mar. 13, 2014   (JP) ................................. 2014-050479

(51) Int. Cl.
| | |
|---|---|
| *B66F 17/00* | (2006.01) |
| *B60K 31/00* | (2006.01) |
| *B66F 9/24* | (2006.01) |
| *B66F 9/20* | (2006.01) |

(52) U.S. Cl.
CPC .............. *B66F 17/003* (2013.01); *B60K 31/00* (2013.01); *B66F 9/20* (2013.01); *B66F 9/24* (2013.01); *B60K 2031/0091* (2013.01)

(58) Field of Classification Search
CPC ............ B66F 17/003; B66F 9/20; B66F 9/24; B60K 31/00; B60K 2013/0091
See application file for complete search history.

(56) References Cited

U.S. PATENT DOCUMENTS

| | | | | |
|---|---|---|---|---|
| 6,363,910 B1 * | 4/2002 | Kreischer | ............... | G05B 11/42 123/339.16 |
| 2009/0240404 A1 * | 9/2009 | Matsuyawa | ............. | F02D 29/04 701/50 |
| 2009/0247356 A1 * | 10/2009 | Hatanaka | ............ | B60W 50/087 477/64 |
| 2009/0265065 A1 * | 10/2009 | Ikari | ..................... | E02F 9/2292 701/50 |
| 2012/0095655 A1 * | 4/2012 | Hyodo | .................. | B60W 10/06 701/50 |
| 2013/0089399 A1 * | 4/2013 | Kaneko | .................. | F02D 29/04 414/642 |
| 2013/0158770 A1 * | 6/2013 | Araki | ....................... | B60K 6/48 701/22 |

FOREIGN PATENT DOCUMENTS

| | | |
|---|---|---|
| EP | 1724235 A1 | 11/2006 |
| EP | 1770054 A2 | 4/2007 |
| JP | 2004-359414 A | 12/2004 |
| WO | 2009084869 A2 | 7/2009 |

OTHER PUBLICATIONS

Communication dated Aug. 6, 2015, issued by the European Patent Office in counterpart Application No. 15158555.1.

* cited by examiner

*Primary Examiner* — Mussa A Shaawat
*Assistant Examiner* — Kelly D Williams
(74) *Attorney, Agent, or Firm* — Sughrue Mion, PLLC

(57) ABSTRACT

A vehicle control device controls a maximum velocity of a forklift by restricting a maximum speed of an engine. Further, the vehicle control device monitors a vehicle velocity. When the vehicle velocity is equal to or higher than a restriction triggering vehicle velocity obtained by subtracting a predetermined velocity from the maximum velocity, the vehicle control device restricts the maximum speed of the engine.

3 Claims, 2 Drawing Sheets

TRAVELING CONTROL DEVICE FOR INDUSTRIAL VEHICLE

BACKGROUND OF THE INVENTION

The present invention relates to a traveling control device for an industrial vehicle in which power of an engine is used for traveling power and power for a cargo handling device.

A forklift is an industrial vehicle equipped with a cargo handling device. In the forklift, power of an engine is used for both traveling power and power for the cargo handling device. For example, Japanese Laid-Open Patent Publication No. 2004-359414 discloses a forklift which controls a maximum velocity by restricting a maximum speed of an engine.

In the forklift disclosed in Japanese Laid-Open Patent Publication No. 2004-359414, when it is detected that the vehicle velocity is 0, it is judged that the forklift is in a state where cargo handling work is performed, and restriction on the maximum speed of an engine is released. In other words, unless the vehicle velocity is 0, a state where the maximum speed of an engine is restricted is maintained. Therefore, when the vehicle velocity is low or medium velocity, because the cargo handling work is performed in a state where the maximum speed of an engine is restricted, it is impossible to fully exert cargo handling performance.

SUMMARY OF THE INVENTION

An object of the present invention is to provide a traveling control device for an industrial vehicle which can fully exert cargo handling performance while restricting a maximum velocity.

To solve the above-described problem, according to one aspect of the present invention, a traveling control device for an industrial vehicle is provided. The industrial vehicle includes an engine, a power transmitting mechanism for transmitting power of the engine to drive wheels, and a cargo handling device activated by the power of the engine. The traveling control device includes a control unit that controls a maximum velocity of the vehicle by restricting a maximum speed of the engine, and a vehicle velocity detecting unit that detects a vehicle velocity. When the vehicle velocity detected by the vehicle velocity detecting unit is equal to or higher than a restriction triggering vehicle velocity obtained by subtracting a predetermined velocity from the maximum velocity, the control unit restricts the maximum speed of the engine.

DETAILED DESCRIPTION OF THE PREFERRED EMBODIMENTS

An embodiment in which a traveling control device for an industrial vehicle of the present invention is embodied will be described below with reference to FIG. 1 and FIG. 2.

Figure 1:
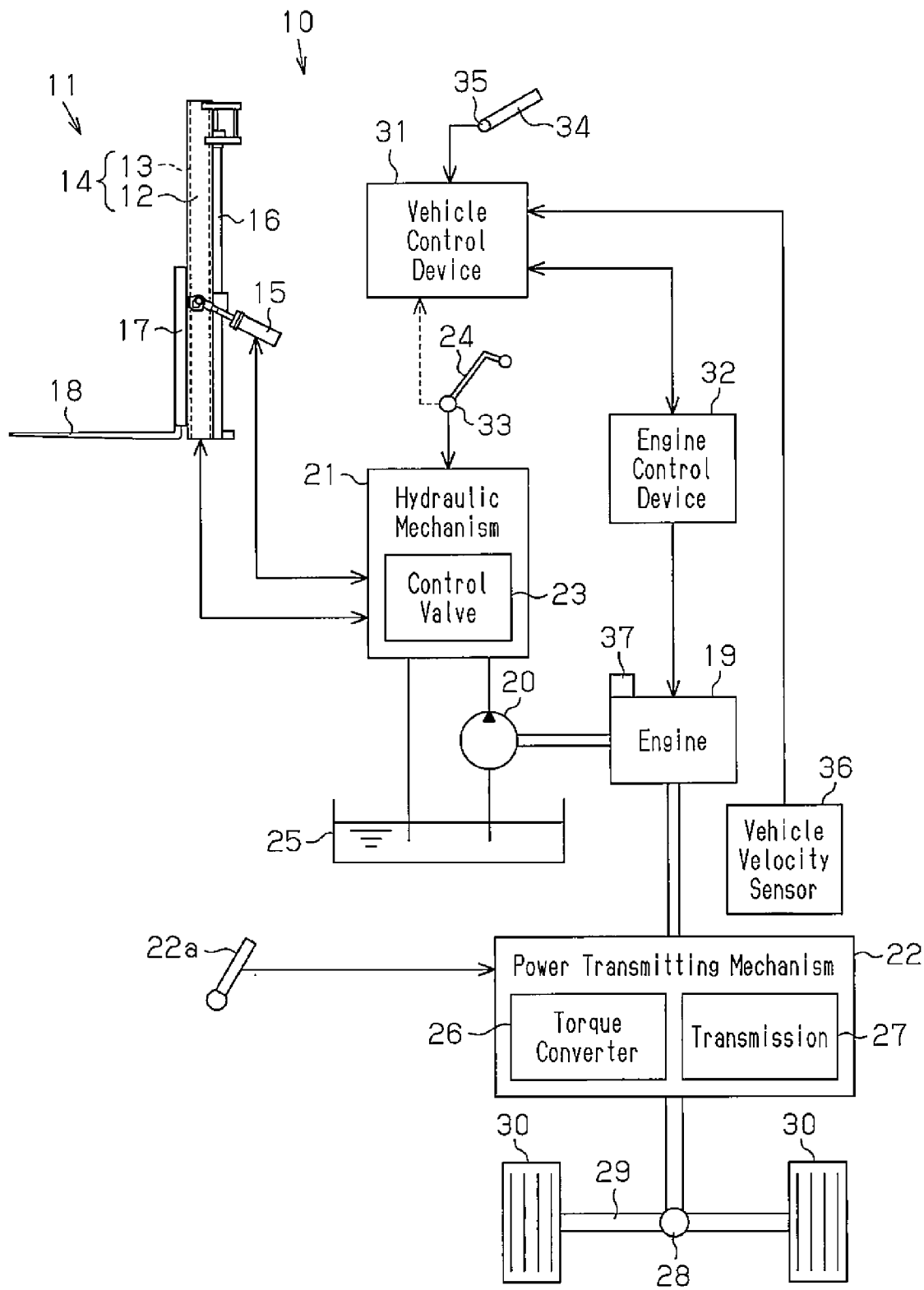
FIG. 1 is a schematic diagram illustrating an overall configuration of a forklift.

As illustrated in FIG. 1, a forklift 10 as an industrial vehicle includes a vehicle body and a cargo handling device 11 mounted on the vehicle body. The cargo handling device 11 includes a multistage mast 14. The mast 14 is configured with a pair of outer mast 12 and a pair of inner mast 13. A hydraulic tilt cylinder 15 is coupled to the outer mast 12. A hydraulic lift cylinder 16 is coupled to the inner mast 13. When hydraulic oil is supplied to the tilt cylinder 15 or hydraulic oil is discharged from the tilt cylinder 15, the mast 14 tilts in a longitudinal direction of the vehicle body. When hydraulic oil is supplied to the lift cylinder 16 or hydraulic oil is discharged from the lift cylinder 16, the inner mast 13 moves in a vertical direction of the vehicle body. A fork 18 is attached to the inner mast 13 via a lift bracket 17. When the lift cylinder 16 is activated and the inner mast 13 moves upward or downward along the outer mast 12, the fork 18 moves upward or downward along with the lift bracket 17.

On the vehicle body of the forklift 10, an engine 19, a hydraulic pump 20 which is driven by the engine 19, a hydraulic mechanism 21, and a power transmitting mechanism 22 for transmitting power of the engine 19 are mounted. The engine 19 becomes a drive source for traveling operation and cargo handling operation. Hydraulic oil ejected from the hydraulic pump 20 is supplied to the hydraulic mechanism 21.

The hydraulic mechanism 21 has a control valve 23. The control valve 23 controls supply of hydraulic oil to the tilt cylinder 15 and the lift cylinder 16 and discharging of hydraulic oil from the tilt cylinder 15 and the lift cylinder 16. A cargo handling operating member 24 is mechanically coupled to the control valve 23. An operator gives an instruction for operation of the tilt cylinder 15 and the lift cylinder 16 by operating the cargo handling operating member 24. The operator switches a state of the control valve 23 between an open state and a closed state by operating the cargo handling operating member 24. Hydraulic oil of an oil tank 25 is pumped up by the hydraulic pump 20 and supplied to the tilt cylinder 15 and the lift cylinder 16 via the hydraulic mechanism 21. Hydraulic oil discharged from the tilt cylinder 15 and the lift cylinder 16 is returned to the oil tank 25 via the hydraulic mechanism 21.

The power transmitting mechanism 22 has a mechanism for transmitting power for a torque converter 26, a transmission 27, and the like. An axle 29 is coupled to the engine 19 via the power transmitting mechanism 22 and a differential gear 28. Drive wheels 30 are respectively coupled to the both ends of the axle 29. The power of the engine 19 is transmitted to the drive wheels 30 via the power transmitting mechanism 22, the differential gear 28 and the axle 29. The torque converter 26 has a clutch which mechanically switches a power transmission state. The clutch switches the state between a power transmission state in which the power of the engine 19 is transmitted to the axle 29 and a power non-transmission state in which the power of the engine 19 is not transmitted to the axle 29.

At an operator's seat of the forklift 10, an inching pedal 22a for performing inching operation is located. The inching pedal 22a coordinates with a brake pedal which is located at the operator's seat and which is not illustrated, in the middle of the operation. The inching pedal 22a does not coordinate with the brake pedal and operates independently from the brake pedal in an inching region. Meanwhile, the inching pedal 22a coordinates with the brake pedal in a brake region corresponding to a region outside the inching region. The inching region is a region in which the clutch is put into a half-clutch state by the operator stepping on the inching pedal 22a. The brake region is a region in which braking force acts on the vehicle by the operator further stepping on the inching pedal 22a. The inching pedal 22a is operated to put the clutch configuring the transmission 27 into a half-clutch state, for example, when the operator manually operates slow traveling of the vehicle while performing cargo handling work.

Further, on the vehicle body of the forklift 10, a vehicle control device 31 as a control unit and an engine control device 32 are mounted. The engine control device 32 is electrically connected to the vehicle control device 31. A detection sensor 33 that detects an operating state of the cargo handling operating member 24 and an accelerator sensor 35 that detects an accelerator opening degree are electrically connected to the vehicle control device 31. The accelerator opening degree corresponds to an operation amount when the operator operates an accelerator operating member 34 to accelerate the forklift 10. A vehicle velocity sensor 36 as a vehicle velocity detecting unit that detects a vehicle velocity is electrically connected to the vehicle control device 31.

The vehicle control device 31 controls engine speed by outputting a speed instruction of the engine 19 to the engine control device 32. The engine control device 32 controls the engine 19 based on the input speed instruction. The speed sensor 37 as a speed detecting unit detects the actual speed of the engine 19. The engine control device 32 outputs the actual speed of the engine 19 input from the speed sensor 37 to the vehicle control device 31. The hydraulic pump 20 is driven by the engine 19. Therefore, the operator of the forklift 10 causes the tilt cylinder 15 and the lift cylinder 16 to operate by stepping on the accelerator operating member 34 and operating the cargo operating member 24.

Control of the maximum velocity of the vehicle will be described next with reference to FIG. 2A to FIG. 2C.

Figure 2A:
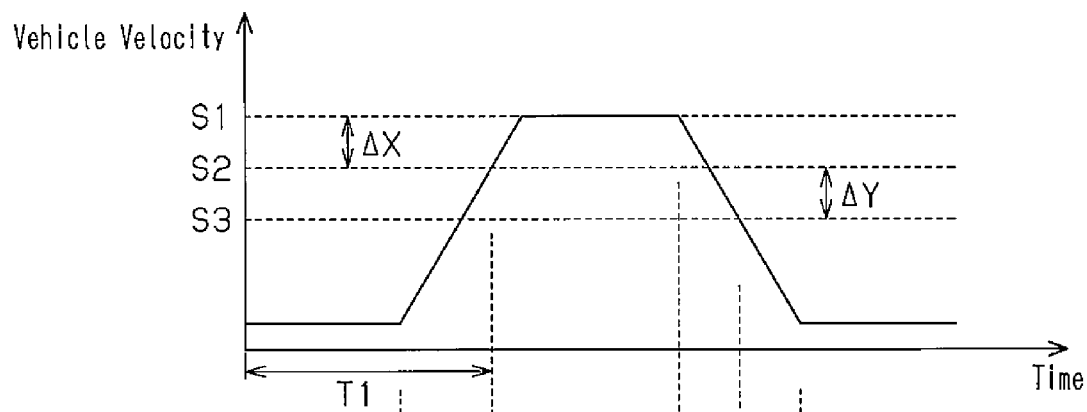
FIG. 2A is a graph illustrating change in vehicle velocity.

As illustrated in FIG. 2A, a vehicle velocity S1 (km/h), vehicle velocity S2 (km/h) and a vehicle velocity S3 (km/h) are set to the vehicle control device S1 for controlling the vehicle velocity. The vehicle velocity S1 (km/h) corresponds to the maximum velocity of the forklift 10. The vehicle velocity S2 (km/h) corresponds to a restriction triggering vehicle velocity which becomes a trigger for restricting the maximum speed of the engine 19. The vehicle velocity S3 (km/h) corresponds to a release triggering vehicle velocity which becomes a trigger for releasing the restriction of the maximum speed of the engine 19.

The vehicle velocity S1 is a maximum value of the velocity allowable while the forklift 10 is traveling. The vehicle velocity S1 is defined in advance according to a use environment of the forklift 10 when the forklift 10 is designed. The vehicle velocity S2 is velocity obtained by subtracting a predetermined velocity ΔX from the vehicle velocity S1. The velocity ΔX is preferably as small a value as possible, for example, approximately 1 to 3 (km/h). The vehicle velocity S3 is velocity obtained by subtracting a predetermined velocity ΔY from the vehicle velocity S2. The velocity ΔY is preferably as small a value as possible, for example, approximately 1 to 3 (km/h). The vehicle velocity S3 is smaller than the vehicle velocity S2.

Figure 2B:
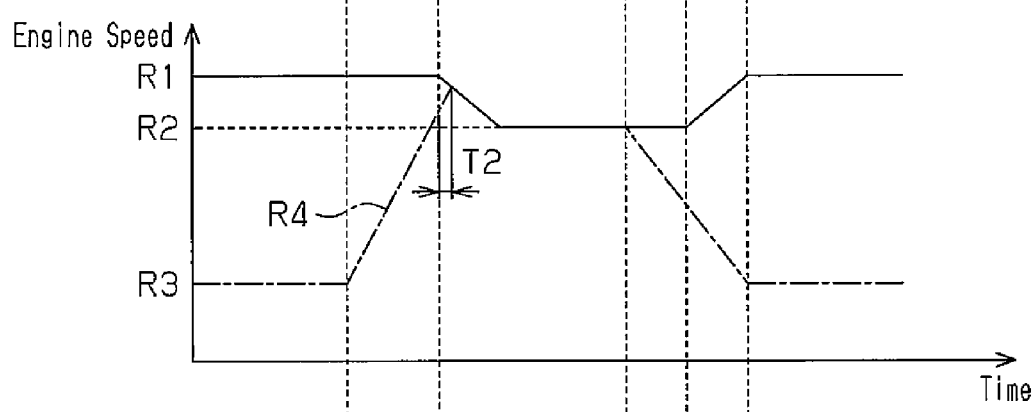
FIG. 2B is a graph illustrating change in engine speed according to the change in the vehicle velocity.
Figure 2C:
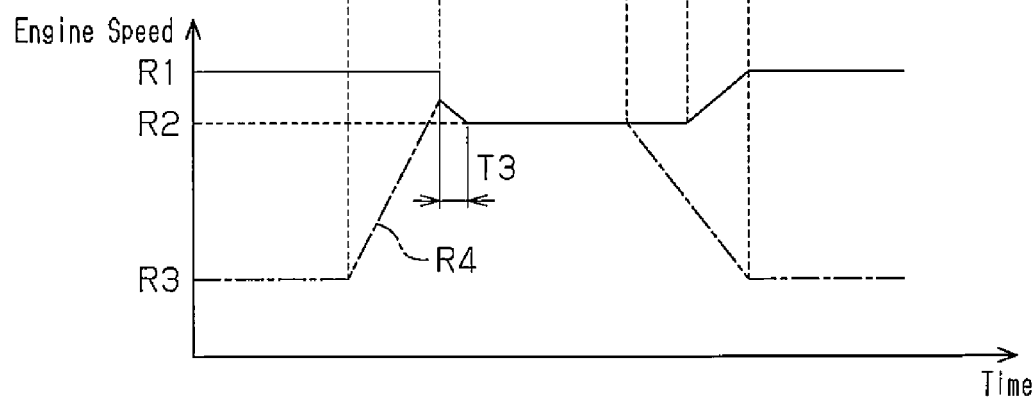
FIG. 2C is a graph illustrating change in the engine speed according to the change in the vehicle velocity.

Solid lines in FIG. 2B and FIG. 2C indicate transition of the maximum speed of the engine 19. The maximum speed is set at a maximum speed R1 when the speed of the engine 19 is not restricted. The maximum speed R1 is a maximum speed (NMR speed) in a non-load state.

When the cargo handling device 11 of the forklift 10 is actuated, the operator operates the inching pedal 22a so that power can be transmitted to the cargo handling device 11. In this state, actuation of the cargo handling device 11 is controlled by the operation amount of the accelerator operating member 34, that is, engine speed according to an accelerator opening degree. By this means, the cargo handling device 11 is actuated at speed according to the operation amount of the accelerator operating member 34. As illustrated in FIG. 2B and FIG. 2C, when the accelerator operating member 34 is fully stepped and the accelerator is fully opened, the engine speed is the maximum speed R1. Meanwhile, in this embodiment, a target restriction speed R2 is set as speed for restricting the maximum speed of the engine 19. The target restriction speed R2 is a maximum speed of the engine 19 in a case where the engine speed is restricted.

As indicated with dashed lines in FIG. 2B and FIG. 2C, when the accelerator opening degree is 0% (in a state where the vehicle is parked), the speed of the engine 19 is idle speed R3. The forklift 10 travels at the engine speed according to the operation amount of the accelerator operating member 34. That is, the forklift 10 travels at a vehicle velocity according to increase or decrease of the engine speed. In other words, the forklift 10 accelerates when the engine speed increases in association with increase of the accelerator opening degree. Meanwhile, the forklift 10 decelerates when the engine speed decreases in association with decrease of the accelerator opening degree.

The vehicle control device 31 monitors the vehicle velocity of the forklift 10 based on the detection result of the vehicle velocity sensor 36. The vehicle control device 31 controls the engine 19 by outputting a speed instruction for giving an instruction for the engine speed according to the accelerator opening degree in a region T1 where the vehicle velocity is lower than the vehicle velocity S2 in a state where the engine speed is not restricted. Therefore, in the region T1, the engine speed is not restricted, and, thus, the cargo handling performance is not restricted. Further, the velocity ΔX is set at a value close to the vehicle velocity S1. Accordingly, even if the cargo handling device 11 is actuated while the forklift 10 is traveling at low or medium velocity (in the region T1), it is possible to fully exert the cargo handling performance.

The vehicle control device 31 restricts the engine speed when the vehicle velocity reaches the vehicle velocity S2 in a state where the engine speed is not restricted. That is, the vehicle control device 31 outputs a speed instruction so that the engine speed matches the predetermined speed. In this embodiment, the maximum speed of the engine 19 in a case where the engine speed is restricted is the target restriction speed R2 illustrated in FIG. 2B and FIG. 2C. At this time, the vehicle control device 31 controls the engine speed based on relationship among the maximum speed R1, the target restriction speed R2 and actual speed R4. The actual speed R4 is detected by the speed sensor 37.

To control the engine speed, the vehicle control device 31 first compares the actual speed R4 with the target restriction speed R2. Then, the vehicle control device 31 compares a first speed which is a higher speed among the target restriction speed R2 and the actual speed R4, with a second speed which is the maximum speed R1. The vehicle control device 31 calculates the lower speed among the first speed and the second speed as a restriction start speed.

For example, when the restriction start speed is the maximum speed R1, the actual speed R4 has already reached the maximum speed R1. Therefore, the vehicle control device 31 outputs a speed instruction for gradually changing the engine speed until the speed reaches the target restriction speed R2 from the maximum speed R1. By this means, because the engine speed gradually decreases over time, it is possible to prevent rapid change in the engine speed. Further, when the restriction start speed is the target restriction speed R2, the actual speed R4 does not reach the target restriction speed R2. Therefore, the vehicle control device 31 outputs a speed instruction for lowering the maximum speed of the engine 19 to the target restriction speed R2 at once. Further, when the restriction start speed is the actual speed R4, the actual speed R4 is lower than the maximum speed R1 and exceeds the target restriction speed R2. Therefore, the vehicle control device 31 outputs a speed instruction for lowering the maximum speed of the engine 19 to the actual speed R4 at once. Then, the vehicle control device 31 outputs a speed instruction for gradually changing the engine speed until the speed reaches the target restriction speed R2.

For example, as illustrated in FIG. 2B, a case will be assumed where the restriction start speed is the actual speed R4 and the maximum speed of the engine 19 is made to gradually change from the maximum speed R1 to the target restriction speed R2. For example, in a region T2 illustrated in FIG. 2B, it may require time for restricting the engine speed because of the control processing. In this case, even after the conditions for restricting the engine speed are met, there is a possibility that the engine speed may further increase and the vehicle may further accelerate.

Therefore, in this embodiment, as illustrated in FIG. 2C, when the restriction start speed is the actual speed R4, the maximum speed of the engine is lowered to the actual speed R4 at once. By this means, in a region T3 illustrated in FIG. 2C, restriction of the engine speed is started from the actual speed R4. Therefore, it possible to prevent the engine speed from increasing after the conditions for restricting the engine speed are met, while preventing rapid change in the engine speed.

Meanwhile, the vehicle control device 31 releases restriction of the engine speed when the vehicle velocity reaches the vehicle velocity S3 in a state where the engine speed is restricted. At this time, as illustrated in FIG. 2B and FIG. 2C, in the vehicle control device 31, the maximum speed of the engine 19 gradually changes from the target restriction speed R2 to the maximum speed R1. By this means, it is possible to prevent rapid change in the engine speed at a time point when the restriction of the engine speed is released.

Accordingly, according to this embodiment, the following advantages can be obtained.

(1) As the conditions for restricting the maximum speed of the engine 19, the conditions that the vehicle velocity should be to or higher than the vehicle velocity S2 (restriction triggering vehicle velocity) are set. That is, if the vehicle velocity is lower than the vehicle velocity S2, the maximum speed of the engine 19 is not restricted. According to this configuration, when the vehicle velocity is equal to or higher than the vehicle velocity S2, the maximum speed of the engine 19 is restricted, so that the maximum velocity of the forklift 10 is restricted. Meanwhile, when the vehicle velocity is lower than the vehicle velocity S2, the maximum speed of the engine 19 is not restricted. Therefore, even when the cargo handling work is performed while the forklift 10 is traveling at low or medium velocity, it is possible to fully exert the cargo handling performance.

(2) When the maximum speed of the engine 19 is restricted, because the engine speed gradually changes, it is possible to prevent rapid change in the engine speed.

(3) When the maximum speed of the engine 19 is restricted, because the engine speed changes while the actual speed R4 is taken into account, it is possible to prevent the engine speed from increasing after the vehicle velocity reaches the vehicle velocity S2.

(4) As the conditions for releasing the restriction of the maximum speed of the engine 19, conditions that the vehicle velocity should be lower than the vehicle velocity S3 (release triggering vehicle velocity) which is lower than the vehicle velocity S2 are set. That is, the vehicle velocity S2 is set at a value which is not the same value as the vehicle velocity S3, but different from the vehicle velocity S3. Therefore, it is possible to prevent the maximum speed of the engine 19 from being frequently restricted or the restriction from being frequently released.

(5) When restriction of the maximum speed of the engine 19 is released, because the engine speed gradually changes, it is possible to prevent rapid change in the engine speed.

(6) Traveling control of the forklift 10 is implemented by a configuration provided to monitor the vehicle velocity or to monitor the engine speed, that is, an existing configuration used for controlling vehicles. In other words, it is not necessary to newly prepare sensors, or the like, to control traveling of the forklift 10. Therefore, it is possible to suppress increase in cost due to addition of control.

The above-described embodiment may be modified as follows.

The industrial vehicle may be an arbitrary vehicle having a cargo handling device, such as a shovel loader.

The cargo handling device may be a cargo handling device having an attachment in place of the fork.

It is also possible to use an electromagnetic valve as the control valve 23 and control an open and closed state of the electromagnetic valve with a signal from the vehicle control device 31.

It is also possible to use a manual type transmission in place of the torque converter as the power transmitting mechanism 22.

When the engine speed is restricted, if the engine speed does not rapidly change because the speed of the engine 19 changes by only a small degree by the restriction, the engine speed may be made to change at once from the restriction start speed to the target restriction speed R2. In a similar manner, when restriction of the engine speed is released, if the engine speed does not rapidly change because the speed of the engine 19 changes by a small degree by the release, the engine speed may be made to change at once.

The invention claimed is:

1. A traveling control device for an industrial vehicle, the industrial vehicle comprising an engine, a power transmitting mechanism for transmitting power of the engine to drive wheels, and a cargo handling device actuated by the power of the engine, the traveling control device comprising:
    a control unit that controls a maximum velocity of the vehicle by restricting a maximum speed of the engine;
    a vehicle velocity detecting unit that detects a vehicle velocity,
    wherein when the vehicle velocity detected by the vehicle velocity detecting unit is equal to or higher than a restriction triggering vehicle velocity obtained by subtracting a predetermined velocity from the maximum velocity, the control unit restricts the maximum speed of the engine; and
    a speed detecting unit that detects an actual speed of the engine,
    wherein when the maximum speed of the engine is restricted, the control unit compares the actual speed with a target restriction speed which is a maximum speed after restriction, and compares a first speed which is a higher speed among the target restriction speed and the actual speed, with a second speed which is a maximum speed of the engine in a non-load state, and changes the speed of the engine based on the lower speed among the first speed and the second speed.

2. The traveling control device for the industrial vehicle according to claim 1, wherein when the vehicle velocity detected by the vehicle velocity detecting unit is lower than a release triggering vehicle velocity obtained by subtracting a predetermined velocity from the restriction triggering vehicle velocity, the control unit releases restriction of the maximum speed of the engine.

3. The traveling control device for the industrial vehicle according to claim 2, wherein when the restriction of the maximum speed of the engine is released, the control unit changes the speed of the engine.

* * * * *